July 2, 1968     M. L. RADER     3,390,469
STEREOGNOSTIC TESTING EQUIPMENT
Filed Aug. 9, 1967
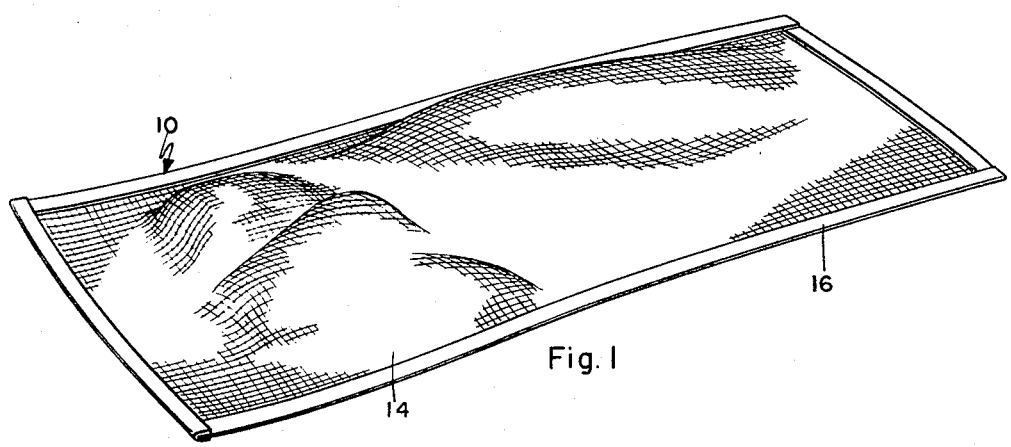
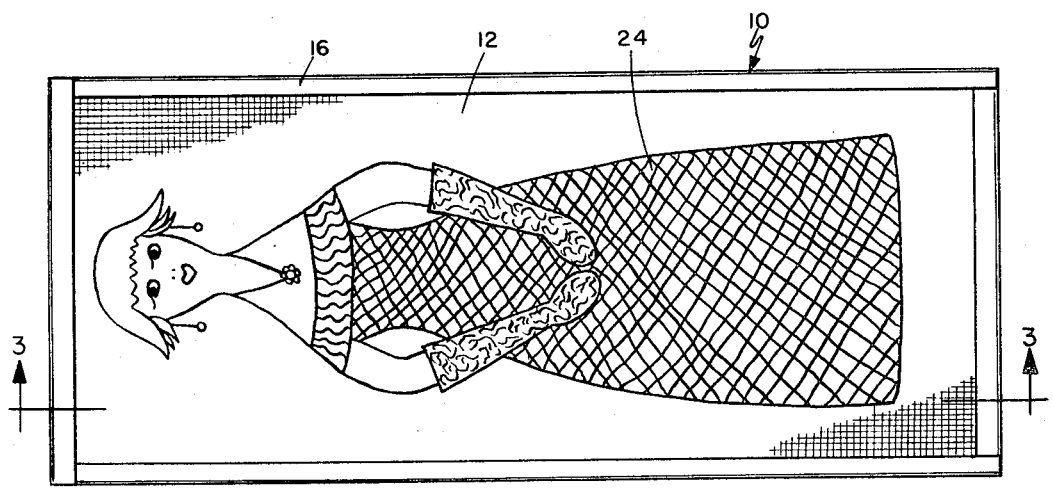
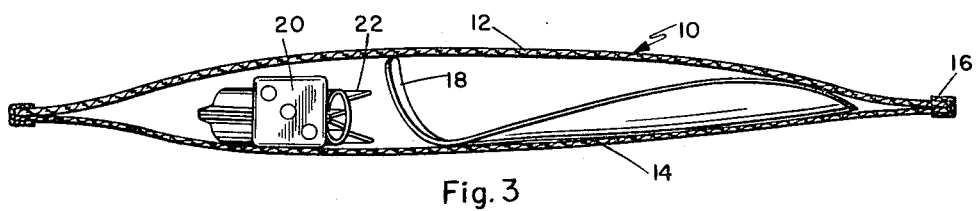
INVENTOR.
MARY L. RADER
BY Knox & Knox

United States Patent Office 3,390,469
Patented July 2, 1968

3,390,469
STEREOGNOSTIC TESTING EQUIPMENT
Mary L. Rader, 1644 Crespo Drive,
La Jolla, Calif. 92037
Filed Aug. 9, 1967, Ser. No. 659,417
2 Claims. (Cl. 35—22)

ABSTRACT OF THE DISCLOSURE

A group of objects, differing distinctly in their characteristics, such as shape, size, weight, resiliency and other factors, are enclosed in a container which conceals the objects visually, but the container having at least a portion thereof flexible so that the objects can be felt and handled to determine their nature. The objects can be of generally unrelated or specific classifications and the equipment is particularly useful for testing or grading mental acuity, intersensory differentiation, stereognostic and tactile sensitivity and attention span.

Background of the invention

The present invention relates to psychological testing and specifically to stereognostic testing equipment of a simple yet widely variable nature, adaptable to many grades and categories of testing.

Some types of psychological tests involve the use of shaped objects which are to be assembled or arranged in a specific manner, or identified, usually visually, so that individual senses and reactions can be analyzed. In elementary education the pupils are often required to associate objects with words, written characters, ideas and the like, to develop intersensory faculties. The ability to use the senses cooperatively is a more reliable indication of individual potential than a high efficiency in any one sensory response. However, present testing equipment of suitable type is either limited in scope or is unnecessarily complex and difficult to use.

Summary of the invention

The equipment described herein is extremely simple and involves the use of one or more special containers in each of which a plurality of objects are enclosed. The objects are chosen to suit the specific testing, or the degree of ability to be determined and are distinctly different in either shape, size, weight, physical characteristics, or combinations of those factors. The objects can be initially chosen to add entertainment value and game making potential and in all cases at least a portion of the container is a flexible panel through which the objects can be felt and manipulated to determine their nature, but the objects are visually concealed. Portions of the container can be provided with distracting decorative material or markings to disguise the visual configuration of the objects if necessary.

Brief description of the drawing

FIGURE 1 is a perspective view of a typical testing unit;

FIGURE 2 is a plan view of the side concealed in FIGURE 1; and

FIGURE 3 is a sectional view taken on line 3—3 of FIGURE 2.

Description of the preferred embodiment

In the form illustrated the container 10 is a generally rectangular bag-like unit of flexible fabric, such as cloth, plastic, or other suitable material. The container is composed of two panels which, for the purposes of description, will be referred to as the front panel 12 and the back panel 14, the panels being secured together around their entire periphery by a seam element 16. The seam can be made with conventional seam binding, stitched or otherwise secured, or the panel edges may be adhered or sealed in any suitable manner compatible with the material used. Front panel 12 is preferably of thicker material than back panel 14, to limit manipulation of the objects from one side. However, both panels could be equal or near equal in thickness and flexibility for some applications, or the front panel could be of stiff material for definite limitation of tactile examination of the contents. Both panels are substantially opaque by virtue of thickness or coloring to prevent easy visual recognition of the objects within.

The objects illustrated as an example are a shoe horn 18, a die 20 and a paper clip 22. These are all distinct in shape, size and feel, the shoe horn having continuous curved surfaces with limited resiliency, the die being a rigid block and the paper clip being an open frame with some resiliency. This combination is typical of a general classification of familiar objects and a very large number of different combinations can be made. For some purposes it may be desirable to limit the selection of objects to a specific category, or, for young children, it would be necessary to use objects with which they are familiar. In each instance the objects must be of such sizes as to be freely movable and separable within the container, to permit ready manipulation of the individual objects. Also the objects should be retentive of their form, that is, not easily crushed, broken, or deformed so that their configuration becomes deceiving.

For some purposes it may be necessary to add to the disguise of the objects by making part of the container, usually the thicker panel 12, distracting in visual appearance. This introduces some choice in the tactile approach, another criterion or factor in the mental test or game characteristic and can be accomplished by decorating this panel with a distracting design, such as the FIGURE 24. Any suitable design, either free form, geometric, or pictorial can be used, depending on the degree of distraction required.

In useful form the testing equipment would comprise a group or set of containers with a variety of objects, according to the purpose of the tests. Each container would be handled individually, preferably with a time limit, and the results recorded or tabulated for analysis. For identification the individual containers could be numbered, marked, or coded in any convenient manner which would not reveal the contents directly.

The equipment has definite entertainment or game characteristics, whether or not combined with testing and the participants handle one, several, or all containers from a set, with or without a time limit and are scored on the number of objects correctly identified. With a suitable choice of objects, the test, game-like or otherwise, can appeal to all age groups and can be of coincidental educational value to children. This latter aspect can be utilized as an aid to or in conjunction with the psychological usage of the equipment.

It is understood that minor variation from the form of the invention disclosed herein may be made without departure from the spirit and scope of the invention, and that the specification and drawing are to be considered as merely illustrative rather than limiting.

I claim:

1. Psychological testing equipment for grading mental acuity and intersensory differentiation, stereognostic and tactile sensitivity, and attention span, comprising:
   a set of coded containers each having therein a different group of unlike objects;
   each container being small, relatively flat, capable of being held in the hand, permanently closed, flexible and retentive of shape;
   each of said unlike objects being of well known and recognizable shape, differing distinctly each from the others in that container and in all the other containers of the set in configuration, size, resiliency and weight, and said objects belonging to different classes having commonly recognized names, whereby the objects may be individually recognized and named by a person handling the container;

each of said containers being formed of a back panel and a front panel secured together around the entire common periphery thereof, both of said panels being substantially opaque and of clothlike flexibility.

2. Equipment according to claim 1 wherein said back panel is more flexible than said front panel and said back panel is undecorated and plain, the front panel having thereon means for diversion of the user's attention away from the more flexible back panel.

References Cited
UNITED STATES PATENTS 3,143,276    8/1964    Nichols    229—53 XR
3,186,628    6/1965    Rohde    229—66

EUGENE R. CAPOZIO, *Primary Examiner.*

W. GRIEB, *Examiner.*